US012535758B2

(12) United States Patent
Sato et al.

(10) Patent No.: US 12,535,758 B2
(45) Date of Patent: Jan. 27, 2026

(54) SHEET DETECTION DEVICE AND IMAGE FORMING APPARATUS

(71) Applicant: CANON KABUSHIKI KAISHA, Tokyo (JP)

(72) Inventors: Hiroki Sato, Ibaraki (JP); Kazusa Morimoto, Chiba (JP); Norio Negishi, Tokyo (JP); Takahiro Oonuma, Chiba (JP); Katsuhide Koga, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/829,762

(22) Filed: Sep. 10, 2024

(65) Prior Publication Data

US 2025/0093802 A1 Mar. 20, 2025

(30) Foreign Application Priority Data

Sep. 14, 2023 (JP) ................................ 2023-149055

(51) Int. Cl.
*G03G 15/00* (2006.01)

(52) U.S. Cl.
CPC ..... *G03G 15/5004* (2013.01); *G03G 15/5029* (2013.01); *G03G 15/6529* (2013.01); *G03G 2215/00637* (2013.01)

(58) Field of Classification Search
CPC .......... G03G 15/5004; G03G 15/5029; G03G 15/6529; G03G 2215/00637
See application file for complete search history.

(56) References Cited

U.S. PATENT DOCUMENTS 8,045,868 B2 10/2011 Kuramochi et al.
8,391,735 B2 3/2013 Kuramochi et al.
9,052,664 B2 6/2015 Kuramochi et al.
2020/0033782 A1* 1/2020 Sugai ................ G03G 15/5029
2021/0302861 A1* 9/2021 Mori ................... G03G 15/043

FOREIGN PATENT DOCUMENTS

JP 2006333214 A 12/2006
JP 2018134845 A 8/2018
JP 2023007007 A 1/2023

* cited by examiner

*Primary Examiner* — Hoang X Ngo
(74) *Attorney, Agent, or Firm* — ROSSI, KIMMS & McDOWELL LLP

(57) ABSTRACT

A sheet detection device includes a measurement unit configured to measure a sheet, and a power supply voltage controller configured to control supply of a power supply voltage to the measurement unit, wherein the power supply voltage controller is configured to start supplying the power supply voltage to the measurement unit when receiving a notification indicating that a mode for performing sheet measurement is set.

13 Claims, 14 Drawing Sheets

| | BASIS WEIGHT | | | | |
|---|---|---|---|---|---|
| C23 | 257~300 | THICK PAPER SHEET 7 | | | EMBOSSED PAPER SHEET 8 |
| C22 | 221~256 | THICK PAPER SHEET 6 | COATED PAPER SHEET 3 | | EMBOSSED PAPER SHEET 7 |
| C21 | 210~220 | | | | |
| C20 | 186~209 | THICK PAPER SHEET 5 | COATED PAPER SHEET 2 | | EMBOSSED PAPER SHEET 6 |
| C19 | 181~185 | | | | |
| C18 | 164~180 | THICK PAPER SHEET 4 | | | EMBOSSED PAPER SHEET 5 |
| C17 | 151~163 | THICK PAPER SHEET 3 | | | |
| C16 | 129~150 | THICK PAPER SHEET 2 | | | EMBOSSED PAPER SHEET 4 |
| C15 | 121~128 | | COATED PAPER SHEET 1 | | |
| C14 | 118~120 | THICK PAPER SHEET 1 | | | EMBOSSED PAPER SHEET 3 |
| C13 | 106~117 | | | | |
| C12 | 100~105 | | | | |
| C11 | 94~99 | PLAIN PAPER SHEET 3 | | RECYCLED PAPER SHEET 3 | EMBOSSED PAPER SHEET 2 |
| C10 | 93 | | | | |
| C9 | 91~92 | | | | |
| C8 | 85~90 | | | | |
| C7 | 82~84 | PLAIN PAPER SHEET 2 | | RECYCLED PAPER SHEET 2 | EMBOSSED PAPER SHEET 1 |
| C6 | 80~81 | | | | |
| C5 | 76~79 | | | | |
| C4 | 70~75 | PLAIN PAPER SHEET 1 | | RECYCLED PAPER SHEET 1 | |
| C3 | 64~69 | | | | |
| C2 | 60~63 | THIN PAPER SHEET 1 | | | |
| C1 | 52~59 | THIN PAPER SHEET 2 | | | |

FIG. 10

| PRINT MODE | ADJACENT PIXEL DIFFERENCE INTEGRATED VALUE | | BRIGHTNESS | | PAPER TYPE | BASIS WEIGHT | |
|---|---|---|---|---|---|---|---|
| | LOWER LIMIT | UPPER LIMIT | LOWER LIMIT | UPPER LIMIT | | LOWER LIMIT | UPPER LIMIT |
| THIN PAPER SHEET 2 | b1 | b2 | a2 | a3 | PLAIN PAPER SHEET | c1 | c2 |
| THIN PAPER SHEET 1 | b1 | b2 | a2 | a3 | PLAIN PAPER SHEET | c2 | c3 |
| ... | ... | ... | ... | ... | ... | ... | ... |
| THICK PAPER SHEET 6 | b1 | b2 | a2 | a3 | PLAIN PAPER SHEET | c22 | c23 |
| ... | ... | ... | ... | ... | ... | ... | ... |
| RECYCLED PAPER SHEET 2 | b2 | b3 | a2 | a3 | PLAIN PAPER SHEET | c9 | c13 |
| ... | ... | ... | ... | ... | ... | ... | ... |
| COATED PAPER SHEET 1 | b0 | b1 | a2 | a3 | COATED PAPER SHEET | c13 | c18 |
| COATED PAPER SHEET 2 | b0 | b1 | a2 | a3 | COATED PAPER SHEET | c18 | c22 |
| ... | ... | ... | ... | ... | ... | ... | ... |

FIG. 11

SHEET DETECTION DEVICE AND IMAGE FORMING APPARATUS

BACKGROUND OF THE INVENTION

Field of the Invention

The present disclosure relates to a sheet detection device which includes a media sensor for discriminating a type of a sheet (sheet type), and an image forming apparatus including such a sheet detection device.

Description of the Related Art

For copying machines, printers, multifunction peripherals, and other such image forming apparatus, types of sheets that can be used have been increasing. For example, the image forming apparatus can print an image on various types of sheets such as sheets having various thicknesses and stiffnesses and synthetic paper sheets using a resin as a raw material instead of pulp. In general, an electrophotographic image forming apparatus prints an image on a sheet by steps of charging, exposing with light, developing, transferring, and fixing. Optimum operating conditions (image forming conditions) in each of the steps differ depending on physical properties (for example, stiffness, basis weight, and surface properties) of a sheet to be used. Thus, it is required for the image forming apparatus to execute printing processing based on image forming conditions corresponding to the type of the sheet.

The type of the sheet is often set manually by a user, for example. However, in a case where the type of the sheet is set manually, due to a reason such as a mistaken operation by the user, the type of the sheet may not be set correctly. In this case, the printing processing is not performed based on the appropriate image forming conditions, and hence the proper image may not be formed. In U.S. Pat. No. 8,045,868, an image forming apparatus which forms an image by using a media sensor to automatically discriminate the type of the sheet is disclosed.

When discriminating the type of the sheet, the media sensor measures a physical property of the sheet as a feature amount. The measurement result obtained by the media sensor has a temperature characteristic. That is, due to a change in the temperature of the media sensor itself, the measurement result of the media sensor fluctuates. This leads to a decrease in the discrimination accuracy of the type of the sheet, and this makes it difficult to set appropriate image forming conditions. The present disclosure has been made in view of the problems described above, and a main object of the present disclosure is to provide a sheet detection device which suppresses an impact of a change in temperature on a measurement result of a media sensor.

SUMMARY OF THE INVENTION

A sheet detection device according to one embodiment of the present disclosure includes a measurement unit configured to measure a sheet, and a power supply voltage controller configured to control supply of a power supply voltage to the measurement unit, wherein the power supply voltage controller is configured to start supplying the power supply voltage to the measurement unit when receiving a notification indicating that a mode for performing sheet measurement is set.

An image forming apparatus according to another embodiment of the present disclosure includes a sheet detection device including a measurement unit configured to measure a sheet, and a power supply voltage controller configured to control supply of a power supply voltage to the measurement unit, an image forming unit configured to form an image on the sheet by using an image forming condition based on a result of measuring the sheet by the measurement unit, and a delivery space to which the sheet having an image formed thereon is to be delivered wherein the power supply voltage controller is configured to start supplying the power supply voltage to the measurement unit when receiving a notification indicating that a mode for performing sheet measurement is set.

Further features of the present invention will become apparent from the following description of exemplary embodiments (with reference to the attached drawings).

BRIEF DESCRIPTION OF THE DRAWINGS

FIG. 10 is a classification table of sheet types.

FIG. 11 is a classification table of sheet types.

DESCRIPTION OF THE EMBODIMENTS

Now, referring to the accompanying drawings, description is given of at least one exemplary embodiment of the present disclosure. In the following description, "basis weight" is the mass per unit area of a sheet, and is expressed in units of gsm.

Image Forming Apparatus

Figure 1:
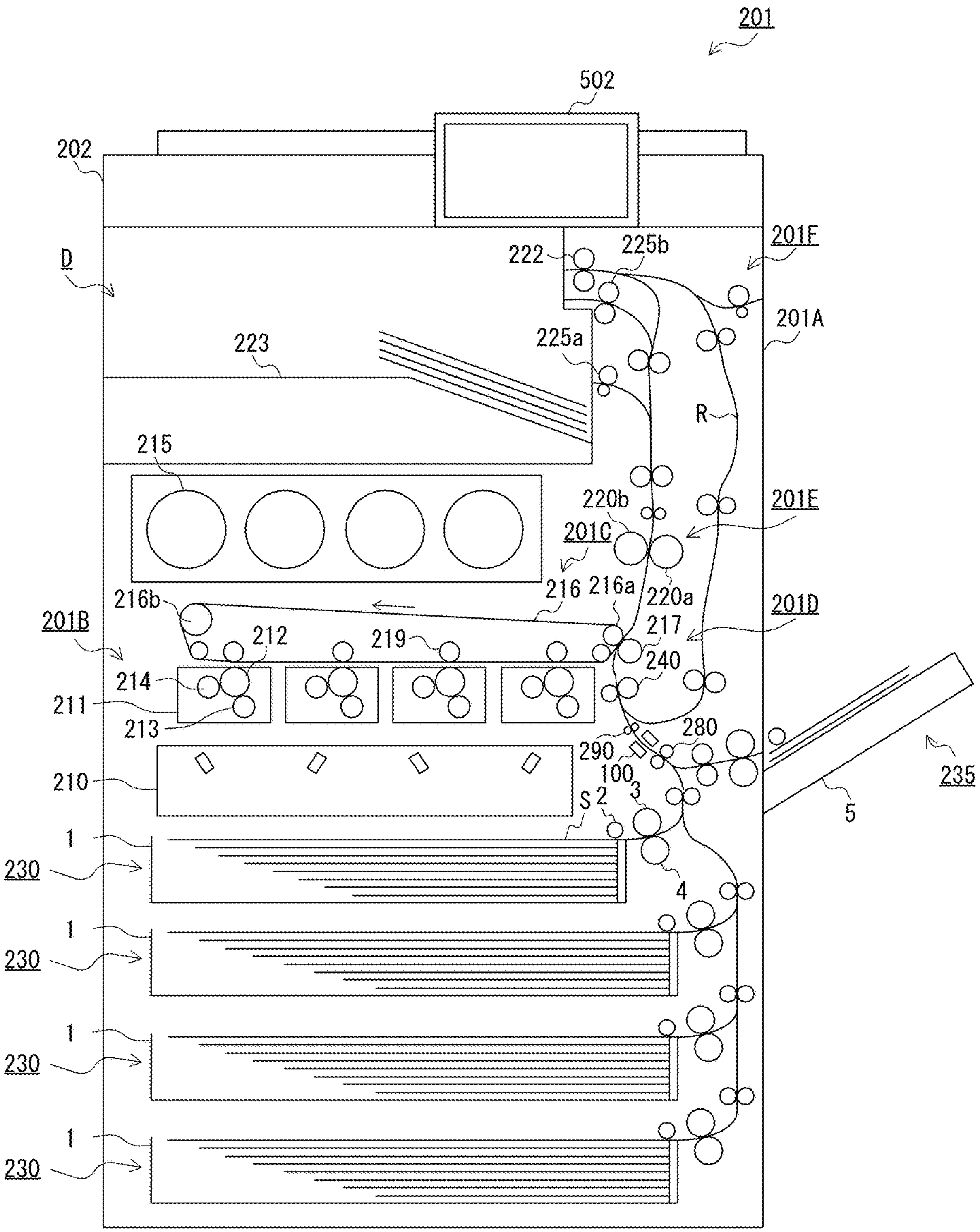
FIG. 1 is a configuration view of an image forming apparatus.

FIG. 1 is a configuration view of an image forming apparatus according to the at least one embodiment. An image forming apparatus 201 according to the at least one embodiment is, for example, a laser beam printer of a tandem intermediate-transfer type using an electrophotographic process. The image forming apparatus 201 forms a full-color image or a monochrome image on a sheet S being a recording medium and outputs the sheet S based on image data acquired from an external device such as a personal computer via a network or based on image data acquired from an image reading device 202 which is provided on the top of the image forming apparatus 201.

The image forming apparatus 201 has, inside a main body 201A, components for forming an image, and includes, on the top of the main body 201A, the image reading device 202 and an operation unit 502. A delivery space D including a placement portion 223 for receiving the sheet S to be delivered thereinto after image formation is defined between the main body 201A of the image forming apparatus 201 and the image reading device 202.

The image reading device 202 is a reader which reads an image from an original to generate image data. The image reading device 202 is used, for example, at the time of processing of copying an original. The image reading device 202 in the at least one embodiment is configured as a part of the image forming apparatus 201. However, the image reading device 202 is not limited to this configuration, and the image reading device 202 may be electrically connected to the image forming apparatus 201 as a device different from the image forming apparatus 201.

The operation unit 502 is a user interface including an input interface and an output interface. Examples of the input interface include various key buttons and a touch panel. Examples of the output interface include a display and a speaker. A user can input various instructions to the image forming apparatus 201 via the operation unit 502. The image forming apparatus 201 notifies the user of various types of information by displaying various screens on the display of the operation unit 502. The operation unit 502 in the at least one embodiment is configured as a part of the image forming apparatus 201. The operation unit 502 is not limited to this configuration, and the operation unit 502 may be electrically connected to the image forming apparatus 201 as a device different from the image forming apparatus 201.

The image forming apparatus 201 includes, in the main body 201A, an image forming unit 201B, an intermediate transfer unit 201C, a secondary transfer unit 201D, a fixing device 201E, and cassette sheet-feeding units 230. The main body 201A includes a manual sheet-feeding unit 235.

The cassette sheet-feeding units 230 each feed sheets S from a corresponding one of sheet-feeding cassettes 1 accommodating the sheets S. The cassette sheet-feeding unit 230 includes a pickup roller 2 and a separation unit. The separation unit includes a feed roller 3 and a retard roller 4 for separating sheets S sent out from the pickup roller 2. The sheets S are fed one by one from the sheet-feeding cassette 1 by the pickup roller 2 and the separation unit. In the at least one embodiment, description is given of a configuration in which a plurality of (in this example, four) cassette sheet-feeding units 230 are provided. However, any number of cassette sheet-feeding units 230 may be provided. The sheet S fed from the cassette sheet-feeding unit 230 is conveyed to a registration roller pair 240 via conveyance roller pairs 280 and 290.

The sheet S can be fed from a unit other than the cassette sheet-feeding unit 230, that is, from the manual sheet-feeding unit 235. The manual sheet-feeding unit 235 includes a manual feeding tray 5 for receiving sheets S placed by the user. Similar to the cassette sheet-feeding unit 230, the manual sheet-feeding unit 235 includes a pickup roller and a separation unit, and sheets S are fed one by one from the manual feeding tray 5. The sheet S fed from the manual sheet-feeding unit 235 is also conveyed to the registration roller pair 240 via the conveyance roller pairs 280 and 290. The conveyance roller pairs 280 and 290 are rotating members for conveying the sheet S.

A media sensor 100 for measuring feature amounts of the sheet S is arranged on a conveyance path between the conveyance roller pair 280 and the conveyance roller pair 290. The conveyance roller pair 280 is arranged an upstream side of the media sensor 100 in a conveyance direction of the sheet S, and the conveyance roller pair 290 is arranged on a downstream side of the media sensor 100 in the conveyance direction of the sheet S. The media sensor 100 outputs, for example, information corresponding to a basis weight (basis weight information) and information corresponding to surface properties (surface property information) as feature amounts of the sheet S conveyed from the cassette sheet-feeding unit 230 or the manual sheet-feeding unit 235. The media sensor 100 may be arranged at at least one or both of a position at which the sheet S fed from the cassette sheet-feeding unit 230 can be measured and a position at which the sheet S fed from the manual sheet-feeding unit 235 can be measured. Details of the configuration of the media sensor 100 are described later.

The image forming unit 201B is of a four-drum full-color type, and includes a laser scanner 210 and four process cartridges 211. The four process cartridges 211 form toner images of four colors, specifically, yellow (Y), magenta (M), cyan (C), and black (K). Each process cartridge 211 includes a photosensitive drum 212, a charging device 213, and a developing device 214. Toner cartridges 215 are arranged above the process cartridges 211. The toner cartridges 215 replenish the respective developing devices 214 with toner.

The intermediate transfer unit 201C includes an intermediate transfer belt 216 wound around a drive roller **216*a* and a tension roller 216*b*. On an inner side of the intermediate transfer belt 216, there are provided four primary transfer rollers 219 which are in abutment against the intermediate transfer belt 216 at positions opposing the photosensitive drums 212. The intermediate transfer belt 216 is rotated in the arrow direction by the drive roller 216*a*** driven by a drive unit (not shown).

The secondary transfer unit 201D includes a secondary transfer roller 217 provided so as to sandwich the intermediate transfer belt 216 at a position opposing the drive roller **216*a*. The fixing device 201E is provided on a downstream side of the secondary transfer roller 217 in the conveyance direction of the sheet S, and includes a pressure roller 220*a* and a heating roller 220*b*. On a downstream side of the fixing device 201E in the conveyance direction of the sheet S, there are arranged a first delivery roller pair 225*a*, a second delivery roller pair 225*b*, and a duplex-printing reversing unit 201F. The duplex-printing reversing unit 201F includes a reversing roller pair 222 and a re-conveyance passage R. The reversing roller pair 222 is rotatable in forward and reverse directions. The re-conveyance passage R allows the sheet S having an image formed on one side thereof to be conveyed to the image forming unit 201**B.

The image forming apparatus 201 having the configuration as described above operates as follows. The image forming apparatus 201 acquires, together with an instruction to start a print job, image data from the image reading device 202 or from an external device and forms an image corresponding to the image data on the sheet S. At this time, the image forming apparatus 201 performs each step of the image formation based on image forming conditions given in accordance with features of the sheet S. A print job is a series of operations performed based a print signal instructing an image to be formed on the sheet S, in which the sheet S is conveyed and an image is formed thereon, and after the image forming operation is complete, the sheet S is delivered to the placement portion 223. The image forming apparatus 201 acquires the instruction to start the print job from the operation unit 502 or an external device.

The image forming unit 201B uses the charging device 213 to uniformly charge surfaces of the photosensitive drums 212 to an electric potential having a predetermined polarity. The laser scanner 210 irradiates the uniformly charged surfaces of the photosensitive drums 212 with corresponding laser beams modulated based on the image data. In this way, electrostatic latent images for corresponding colors (yellow, magenta, cyan, and black) are formed on the respective surfaces of the photosensitive drums 212.

The image forming unit 201B uses the developing devices 214 to develop the electrostatic latent images formed on the photosensitive drums 212. The electrostatic latent images are developed on the photosensitive drums 212 with toners of corresponding colors so that toner images of the corresponding colors are formed on the photosensitive drums 212. The toner images are sequentially transferred from the photosensitive drums 212 to the rotating intermediate transfer belt 216 in superimposition by the primary transfer rollers 219. In this way, a full-color toner image is formed on the intermediate transfer belt 216. The intermediate transfer belt 216 rotates to convey the toner image to the secondary transfer unit 201D.

Concurrently with such operation of forming a toner image, the sheets S are conveyed one by one by the cassette sheet-feeding unit 230 or the manual sheet-feeding unit 235 to the registration roller pair 240. The feature amounts of the sheet S are measured by the media sensor 100 before the sheet S reaches the registration roller pair 240. The image forming apparatus 201 sets image forming conditions based on the measured feature amounts, and performs subsequent image formation based on the set image forming conditions. The image forming conditions to be set include, for example, a voltage value of secondary transfer bias applied to the secondary transfer roller 217 during transfer of the toner image to the sheet S, a fixing temperature at the time of fixing the image by the fixing device 201E, and a conveyance speed of the sheet S at the time of fixing.

The registration roller pair 240 corrects skew of the sheet S conveyed to the registration roller pair 240. After the skew is corrected, the sheet S is conveyed by the registration roller pair 240 to the secondary transfer unit 201D in synchronization with the timing at which the toner image borne on the intermediate transfer belt 216 is conveyed to the secondary transfer unit 201D. The secondary transfer unit 201D transfers the full-color toner image from the intermediate transfer belt 216 onto the sheet S with secondary transfer bias applied to the secondary transfer roller 217.

The sheet S having the toner image transferred thereto is conveyed to the fixing device 201E. The fixing device 201E sandwiches and conveys the sheet S with a roller nip portion defined by the pressure roller 220*a* and the heating roller 220*b*. The fixing device 201E heats the sheet S with the heating roller 220*b* at the time of sandwiching and conveying the sheet S, to thereby melt and mix the toners of respective colors on the sheet S. Further, the fixing device 201E presses the sheet S with the pressure roller 220*a*, to thereby fix the melted and mixed toners to the sheet S. At this time, the viscosity of the melted toner generates a sticking force to the heating roller 220*b* on the sheet S.

Figure 2A:
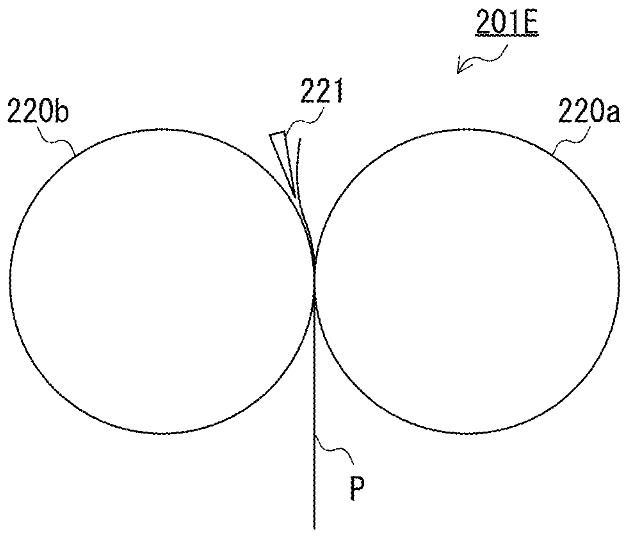
FIG. 2A and FIG. 2B are enlarged views of a fixing device.
Figure 2B:
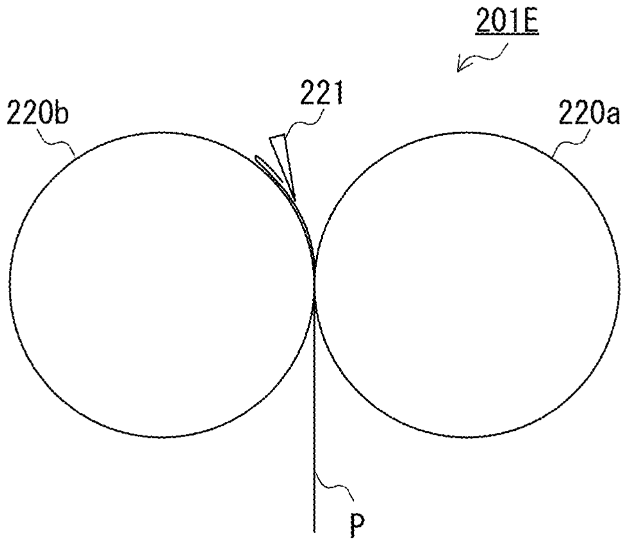

FIG. 2A and FIG. 2B are enlarged views of the fixing device 201E. In a case where the stiffness (strength) of the sheet S is small, the sticking force to the heating roller 220*b* generated on the sheet S may cause the sheet S to be rolled up by the heating roller 220*b* being rotated (FIG. 2B). Thus, a separation plate 221 which separates the sheet S is provided on a downstream side of the heating roller 220*b* in the conveyance direction of the sheet S (FIG. 2A).

The image forming apparatus 201 may determine the state of the separation plate 221 in accordance with the type and basis weight of the sheet S discriminated from the measurement results of the media sensor 100. For example, in a case where the sheet S of a type having a small stiffness is subjected to image formation, the separation plate 221 is arranged such that a distal end of the separation plate 221 is in contact with a surface of the heating roller 220*b* as illustrated in FIG. 2A, to thereby separate the sheet S from the heating roller 220*b*. In a case where the sheet S of a type having a large stiffness is subjected to image formation, the sheet S is not rolled up by the heating roller 220*b*. Thus, the separation plate 221 is arranged such that the distal end of the separation plate 221 is not in contact with the surface of the heating roller 220*b*. In this way, the surface of the heating roller 220*b* can be prevented from being worn by the separation plate 221.

The sheet S having the image fixed thereto is delivered to the delivery space D by any one of the first delivery roller pair 225*a* and the second delivery roller pair 225*b*. The sheet S is placed on a placement portion 223 provided in a protruding manner on a bottom surface of the delivery space D. In a case where images are formed on both sides of the sheet S, the sheet S having an image fixed on one side thereof is conveyed by a reversing roller pair 222 to the re-conveyance passage R. The sheet S is conveyed again to the image forming unit 201B, and an image is formed on another side of the reversed sheet S. The re-conveyance passage R allows the sheet S to be conveyed to the conveyance path between the conveyance roller pair 290 and the registration roller pair 240.

The image forming conditions (for example, conveyance speed at the time of fixing, target fixing temperature, and transfer voltage at the time of secondary transfer) differ depending on the physical properties (for example, basis weight, stiffness, surface properties, and the material) of the sheet S on which the image is to be formed. Thus, it is required to set in advance the image forming conditions in accordance with the feature amounts of the sheet S to be used at the time of image formation.

Depending on the type of the sheet S, there may be some limitations in setting the sheet S to a sheet feeding port (sheet-feeding cassette 1 or manual feeding tray 5). For example, some thick paper sheets having a high stiffness can be fed only from the manual feeding tray 5 with a conveyance path having a small curvature. Coated paper sheets having a smooth surface texture and a strong adhesion between sheets are required to be fed one by one from the manual feeding tray 5 in order to prevent a plurality of sheets from being conveyed on top of each other. Paper sheets made of pulp as a raw material generally have different bending stiffnesses in length and width directions because of bias in orientation directions of pulp fibers (fiber orientation) that occurs due to a manufacturing method. Thus, there is given a recommended orientation of the sheet in length and width directions at the time of setting the sheet to the sheet feeding port so that the bending stiffness against the bending in the conveyance path becomes smaller. Further, for one-side coated paper sheets obtained by coating only one side of a plain paper sheet, an orientation in up-and-down directions is designated at the time of setting in order to perform printing on the coated side.

There are also some types of sheets which cannot be used in the image forming apparatus 201. For example, in a case of a thick paper sheet having an excessively high stiffness, conveyance of the sheet may be stopped due to resistance generated at the time of conveying the sheet along a bent conveyance path. A thin paper sheet having an excessively low stiffness is strongly affected by the sticking force generated between the melted toner and the heating roller 220*b* at the time of passage through the fixing device 201E. Thus, there is a possibility that the sheet cannot be separated from the heating roller 220*b* by the separation plate 221 and is directly wound around the heating roller 220*b* (FIG. 2B). Further, in a case of a synthetic paper sheet which is not made of pulp but of a synthetic resin as a raw material, there is a possibility that the sheet is melted by heating in the fixing device 201E and thereby contaminate the heating roller 220*b*.

Thus, in order to perform image formation appropriately, it is important to identify the type of the sheet S to be used based on the feature amounts of the sheet S before image formation. Therefore, it is required for the media sensor 100 to measure the feature amounts of the sheet S before the sheet S is conveyed to the secondary transfer unit 201D.

Controller

Figure 3:
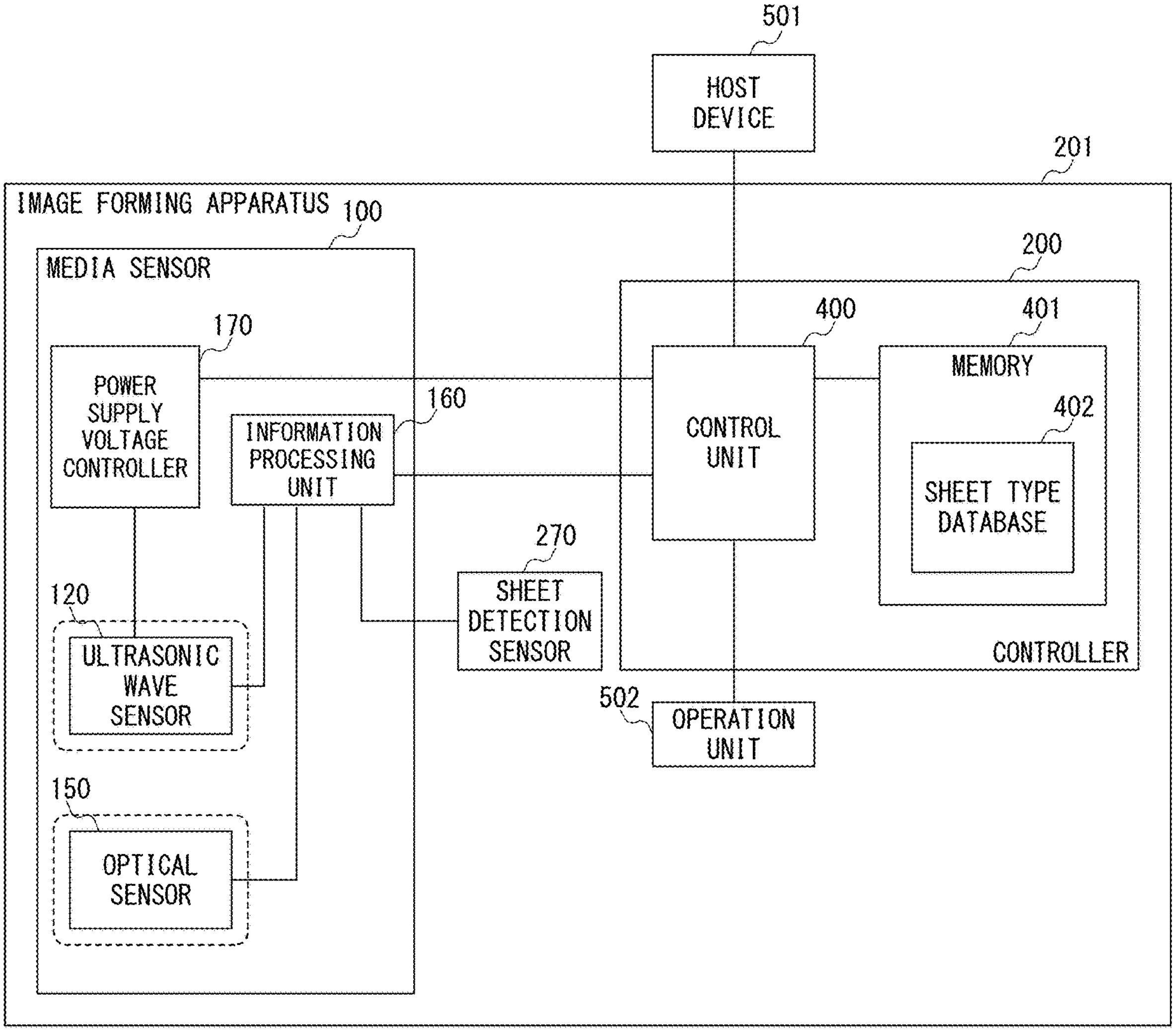
FIG. 3 is an explanatory diagram of a controller.

FIG. 3 is an explanatory diagram of a controller which controls operation of such image forming apparatus 201. A controller 200 is, for example, an information processing device including a central processing unit (CPU). The controller 200 may be achieved by, for example, a microprocessor unit (MPU) or an application specific integrated circuit (ASIC). The controller 200 controls the above-mentioned image forming processing (printing operation) performed by the image forming apparatus 201.

The controller 200 includes a control unit 400 and a memory 401. The memory 401 stores, for example, a control program for the image forming operation, initial values of various setting values, and various types of data required for the image forming operation. Further, the memory 401 has a storage area for storing a sheet type database 402. The sheet type database 402 is a database in which correspondences among sheet feature amounts, sheet types, and image forming conditions are set in advance. The control unit 400 is connected to the operation unit 502, a host device 501, which is an external device, and the media sensor 100.

The host device 501 is, for example, a personal computer, an image scanner, or a facsimile machine. The operation unit 502 inputs, for example, instructions and settings received via the input interface to the control unit 400. The operation unit 502 outputs various types of information via the output interface under the control of the control unit 400. As described above, the operation unit 502 includes the display as the output interface, and displays various types of information on the display.

The control unit 400 acquires an instruction to start a print job from the host device 501 or the operation unit 502, and starts the print job. The control unit 400 acquires image data from the host device 501 or the image reading device 202, and performs image processing on the acquired image data. The control unit 400 executes the print job by causing the image forming unit 201B to form a toner image based on the image data that has been subjected to image processing, and feeding the sheet S.

The media sensor 100 includes an information processing unit 160, a power supply voltage controller 170, an ultrasonic wave sensor 120, and an optical sensor 150. In the at least one embodiment, the ultrasonic wave sensor 120 and the optical sensor 150 are used as a sheet measurement unit. In addition to the ultrasonic wave sensor 120 and the optical sensor 150, a sheet detection sensor 270 is connected to the information processing unit 160. The information processing unit 160 is an information processing device achieved by, for example, a CPU, an MPU, or an ASIC. The information processing unit 160 controls measurement operations by the media sensor 100, and processes the measurement results.

Operation of the media sensor 100 is controlled by the information processing unit 160, and the processing of the measurement results of each of the ultrasonic wave sensor 120 and the optical sensor 150 is performed by information processing unit 160. The information processing unit 160 operates under the control of the control unit 400, and transmits the feature amounts of the sheet S obtained from the measurement results of each of the ultrasonic wave sensor 120 and the optical sensor 150 to the control unit 400.

The control unit 400 discriminates the sheet type and sets image forming conditions corresponding to the sheet type based on the measurement results (feature amounts of the sheet) of the media sensor 100 processed by the information processing unit 160. The image forming conditions (for example, conveyance speed at the time of fixing, target fixing temperature, and transfer voltage at the time of secondary transfer) vary depending on the physical properties (for example, basis weight, stiffness, surface properties, and material) of the sheet S on which the image is to be formed. Therefore, when forming an image, it is required to set in advance image forming conditions corresponding to the feature amounts of the sheet S to be used.

The sheet detection sensor 270 is a sensor for detecting the sheet S conveyed to the measurement position of the media sensor 100. The information processing unit 160 starts the processing for measuring the feature amounts of the sheet S by the sheet measurement unit (ultrasonic wave sensor 120 and optical sensor 150) in response to detection of the sheet S by the sheet detection sensor 270.

The ultrasonic wave sensor 120 measures the sheet S by using ultrasonic waves, and outputs an output value of a predetermined voltage value as a measurement result. The information processing unit 160 acquires the output value of the ultrasonic wave sensor 120, and derives the transmittance of the sheet S from the output value given in a case where the sheet S is present and the output value given when the sheet S is not present. The information processing unit 160 detects the basis weight information from the transmittance of the sheet S. The optical sensor 150 is, for example, a contact image sensor (CIS). The information processing unit 160 stores a luminance value of each pixel as an imaging result obtained by the optical sensor 150. The information processing unit 160 converts the stored luminance value of each pixel into surface property information such as a difference integrated value, which is the sum of the differences in luminance values of adjacent pixels, and a brightness integrated value, which is the sum of the luminance values of each pixel.

The information processing unit 160 transmits the basis weight information and the surface property information to the control unit 400. The control unit 400 determines the sheet type and the basis weight of the sheet S based on the acquired basis weight information and surface property information. The control unit 400 discriminates the sheet type of the sheet S based on a plurality of pieces of information stored in the sheet type database 402, and determines the image forming conditions (for example, secondary transfer bias value, target fixing temperature of the fixing device 201E, and conveyance speed at the time of fixing) corresponding to the sheet type and the basis weight.

The control unit 400 displays the determined image forming conditions on the display of the operation unit 502. Further, the control unit 400 controls the image forming operation based on the determined image forming conditions.

The power supply voltage controller 170 is connected to the control unit 400. The power supply voltage controller 170 controls the supply of the power supply voltage for operating the media sensor 100 based on a command signal acquired from the control unit 400. In the at least one embodiment, the power supply voltage controller 170 controls the supply of the power supply voltage to the ultrasonic wave sensor 120.

Configuration of Media Sensor

Figure 4:
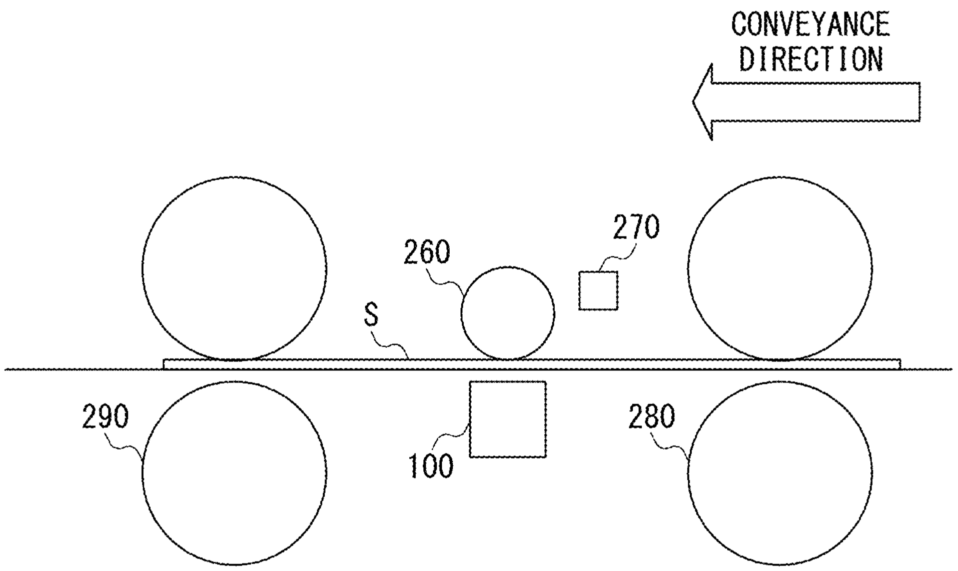
FIG. 4 is an explanatory view of a configuration of a media sensor.
Figure 5:
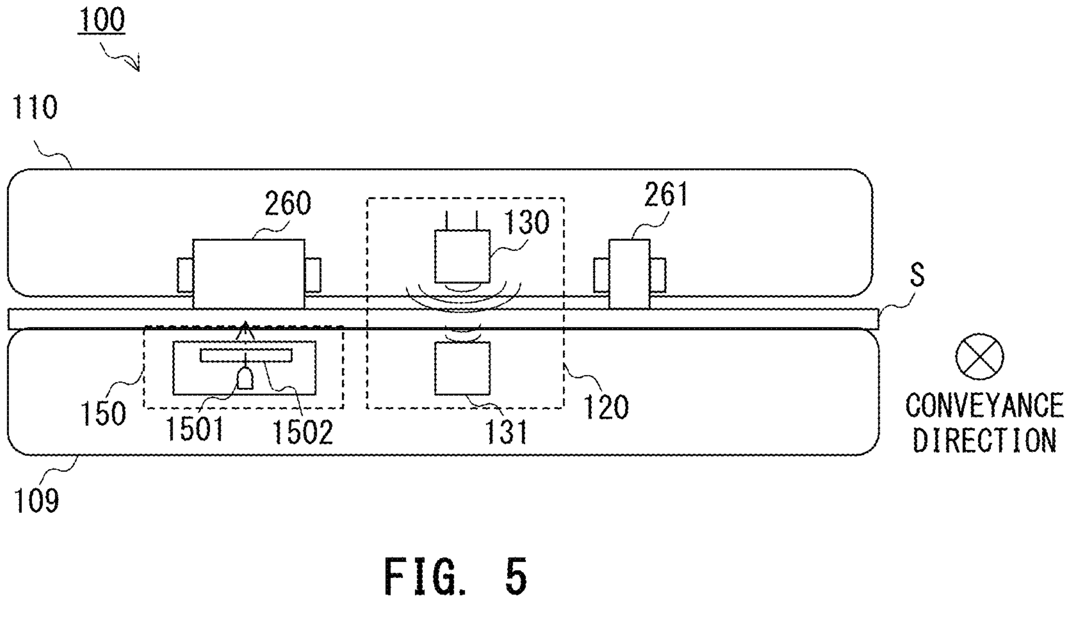
FIG. 5 is an explanatory view of a configuration of a media sensor.

FIG. 4 and FIG. 5 are each explanatory views of the configuration of the media sensor 100. FIG. 4 is a view of the media sensor 100 viewed from a direction orthogonal to the conveyance direction of the sheet S. FIG. 5 is a view of the media sensor 100 viewed from the upstream side in the conveyance direction of the sheet S.

As illustrated in FIG. 4, the media sensor 100 is arranged between the conveyance roller pair 280 and the conveyance roller pair 290, and acquires the feature amounts (basis weight information and surface property information) of the conveyed sheet S. The sheet detection sensor 270 is arranged on the upstream side of the media sensor 100 (on the conveyance roller pair 280 side) in the conveyance direction of the sheet S.

As illustrated in FIG. 5, in the media sensor 100, the ultrasonic wave sensor 120 and the optical sensor 150 are arranged at the same position in the conveyance direction of the sheet S, and are arranged side by side in the direction orthogonal to the conveyance direction. The ultrasonic wave sensor 120 includes an ultrasonic wave transmitter 130 and an ultrasonic wave receiver 131. The optical sensor 150 is a CIS including a light source 1501 (for example, an LED) and a line sensor 1502. The optical sensor 150 may be configured by using a CCD image sensor or a CMOS image sensor.

The optical sensor 150 measures the luminance value of received light in order to measure the surface properties of the sheet S. For this purpose, it is required that the sheet S be held at an optical focus position of the optical sensor 150. When the ultrasonic wave sensor 120 measures the sheet S, measurement accuracy is improved when there is no influence due to fluttering of the conveyed sheet S. For this reason, it is required that the sheet S be conveyed with a stable posture.

In the at least one embodiment, in order to convey the sheet S with a stable posture, a sheet pressing roller 260 and a sheet pressing roller 261 are arranged between the conveyance roller pair 280 and the conveyance roller pair 290. The sheet pressing roller 260 and the sheet pressing roller 261 are arranged at the same position in the conveyance direction of the sheet S. The sheet pressing roller 260 is arranged facing the optical sensor 150 across the conveyance path. The sheet pressing rollers 260 and 261 are configured to move between a first position away from the media sensor 100 and a second position close to the media sensor 100. In FIG. 4 and FIG. 5, a state in which the sheet pressing rollers 260 and 261 are arranged at the second position is illustrated. The sheet pressing rollers 260 and 261 are configured so that when arranged at the second position, the sheet pressing rollers 260 and 261 press the sheet S toward the media sensor 100 (optical sensor 150).

When arranged at the second position, the sheet pressing rollers 260 and 261 are pressed against the sheet S, which has stopped being conveyed. The sheet S is pressed against the media sensor 100 by the sheet pressing rollers 260 and 261. That is, the sheet pressing rollers 260 and 261 are pressing members that press the sheet S and cause the sheet S to abut against the media sensor 100. Through causing the sheet S to abut against the media sensor 100, variations in position and posture are reduced. Thus, the media sensor 100 can measure feature amounts of the sheet S, such as the surface properties and the basis weight, in a stable state. It is noted that the sheet pressing rollers 260 and 261 move to the second position and press the sheet S only at the time of measurement of the sheet S, and retract to the first position when not measuring the sheet S. For that reason, the sheet S is conveyed to the measurement position of the media sensor 100 without being hindered from entering the measurement position (ultrasonic wave sensor 120 and optical sensor 150).

In a case where the sheet pressing rollers 260 and 261 are arranged at the second position without the conveyance of the sheet S being stopped, the conveyance causes the sheet S to flutter, which may cause the sheet S to skew or jam. It is important that the longitudinal direction of the line sensor 1502 be orthogonal to the conveyance direction of the sheet S. For this purpose, the sheet pressing rollers 260 and 261 are pressed against the stopped sheet S, making it possible to stably measure the feature amounts. The control unit 400 restarts the conveyance of the sheet S with the posture of the sheet S in a stable state, and at the same time, instructs the information processing unit 160 to measure the feature amounts of the sheet S by using the media sensor 100. In response to that instruction, the information processing unit 160 starts measuring the feature amount of sheet S by using the media sensor 100.

Measurement of Basis Weight

As illustrated in FIG. 5, in the ultrasonic wave sensor 120, the ultrasonic wave transmitter 130 and the ultrasonic wave receiver 131 are arranged at opposing positions across the conveyance path. The ultrasonic wave transmitter 130 is arranged on an upper block 110 side of the media sensor 100. The ultrasonic wave receiver 131 is arranged on a lower block 109 side of the media sensor 100. The ultrasonic wave sensor 120 receives ultrasonic waves output from the ultrasonic wave transmitter 130 via the conveyance path of sheet S by the ultrasonic wave receiver 131. The ultrasonic wave receiver 131 outputs information (output value) for determining the basis weight of the sheet S based on the received ultrasonic waves.

The ultrasonic wave transmitter 130 and the ultrasonic wave receiver 131 are each formed of a piezoelectric element (also referred to as "piezo element"), which is an element for mutual conversion between a mechanical displacement and an electric signal, and an electrode terminal. The ultrasonic wave transmitter 130 generates ultrasonic waves through oscillation of the piezoelectric element in response to input of a pulse voltage having a predetermined frequency to the electrode terminal. The generated ultrasonic waves propagate through air. Upon arrival of the ultrasonic waves to the sheet S, the ultrasonic waves cause the sheet S to vibrate. The ultrasonic waves generated in the ultrasonic wave transmitter 130 propagate to the ultrasonic wave receiver 131 via the sheet S. The piezoelectric element of the ultrasonic wave receiver 131 causes the electrode terminal to generate an output voltage corresponding to an amplitude of the received ultrasonic waves. The output voltage has a voltage value corresponding to the basis weight of the sheet S. The output voltage is transmitted as an output value to the information processing unit 160.

Attenuation of the amplitude of the ultrasonic waves is larger when the sheet S is present than when the sheet S is not present. Thus, the output value (output voltage) output from the ultrasonic wave receiver 131 has a different value depending on the presence or absence of the sheet S. The ratio between the output voltage given when the sheet S is not present and the output voltage given when the sheet S is present between the ultrasonic wave transmitter 130 and the ultrasonic wave receiver 131 is the transmittance. The transmittance of the ultrasonic waves changes in accordance with the basis weight (area density) of the sheet S. Thus, the basis weight of the sheet S can be estimated by using a conversion formula or a conversion table between transmittance and basis weight. In this way, the basis weight of the sheet S is measured by the ultrasonic wave sensor 120.

Measurement of Surface Properties

The surface properties of the sheet S are measured by using the optical sensor 150. Light emitted from the light source 1501 illuminates the sheet S at a constant angle by a light guide (not shown). The sheet S reflects the irradiated light. The light reflected by the sheet S forms an image on a light receiving surface of the line sensor 1502 via a lens (not shown). In this way, the line sensor 1502 can read the light reflected from sheet S as an image.

In the line sensor 1502, a plurality of light receiving elements are arranged in a direction orthogonal to the conveyance direction of the sheet S, and thus the line sensor 1502 can read an image corresponding to one line in the direction orthogonal to the conveyance direction at a time. In the at least one embodiment, the line sensor 1502 can read an image of 400 pixels at a time.

In the at least one embodiment, a plurality of light receiving elements are arranged so that the line sensor 1502 can read an image at a resolution of 300 dpi. The image corresponding to one line which is read at a time by the line sensor 1502 is insufficient as the information amount for determining the surface properties of the sheet S. This is because in an image corresponding to one line, there is a large deviation in the reading results of each reading position. For that reason, the optical sensor 150 performs the reading operation a plurality of times on the conveyed sheet S, and acquires the reading results of the images of a plurality of lines of the sheet S. Through connecting the reading results of a plurality of lines in the conveyance direction of the sheet S, it becomes possible to determine the trend of the surface properties of the sheet S for a predetermined size.

Increase in Temperature of Media Sensor

In a case where the image forming apparatus 201 is activated, the image forming apparatus 201 supplies a power supply voltage to each component so that each component becomes ready for operation. In a case where the image forming apparatus 201 is activated, a power supply voltage also starts to be applied to the media sensor 100, and the media sensor 100 becomes ready for operation. The application of the power supply voltage causes the temperature of the media sensor 100 to increase. The increase in temperature affects the output value (output voltage), and causes different output values to be output even in the case of measuring the same type of sheet, for example. This phenomenon is particularly noticeable for the ultrasonic wave sensor 120.

Figure 6:
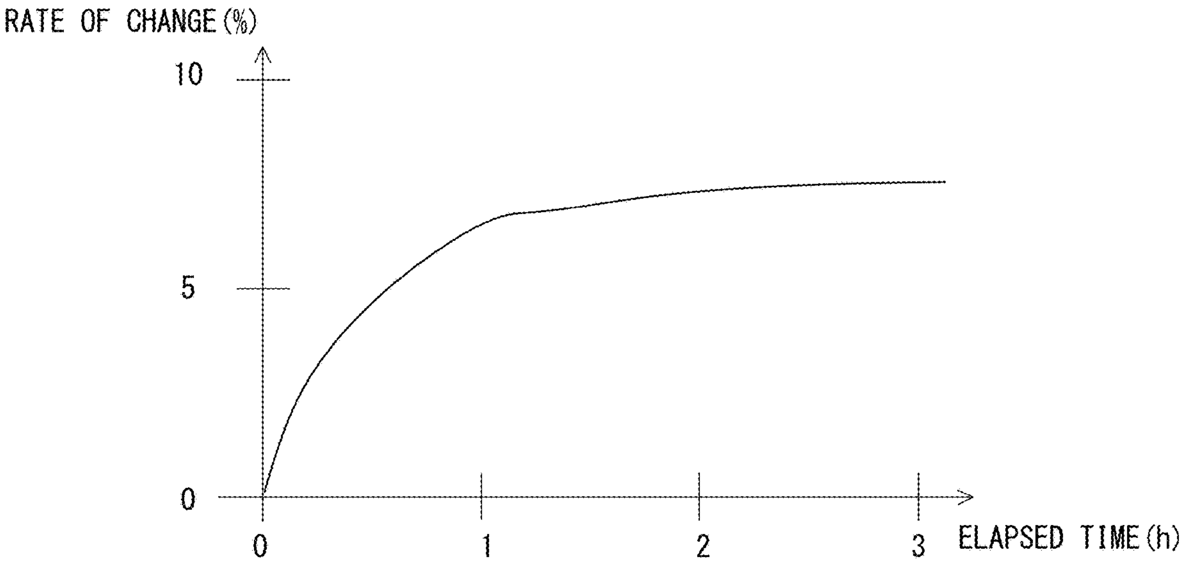
FIG. 6 is a graph for showing temperature characteristics of an output value of an ultrasonic wave sensor.

FIG. 6 is a graph for showing temperature characteristics of the output value of the ultrasonic wave sensor 120. As is clear from this graph, the rate of change in the output value of the ultrasonic wave sensor 120 increases as a duration (elapsed time) for which the power supply voltage is applied to the ultrasonic wave sensor 120 increases. In particular, the rate of change fluctuates greatly for one hour after the start of application of the power supply voltage. The ultrasonic wave sensor 120 generates heat in a case where the power supply voltage is applied, and as a result the temperature of the ultrasonic wave sensor 120 increases. In this way, the temperature increase of the media sensor 100 affects the measurement results, making it difficult to accurately measure the feature amounts of the sheet S. In a case where the feature amounts are not accurately measured, it is difficult to accurately discriminate the type of the sheet S, which affects the setting of appropriate image forming conditions.

Figure 7:
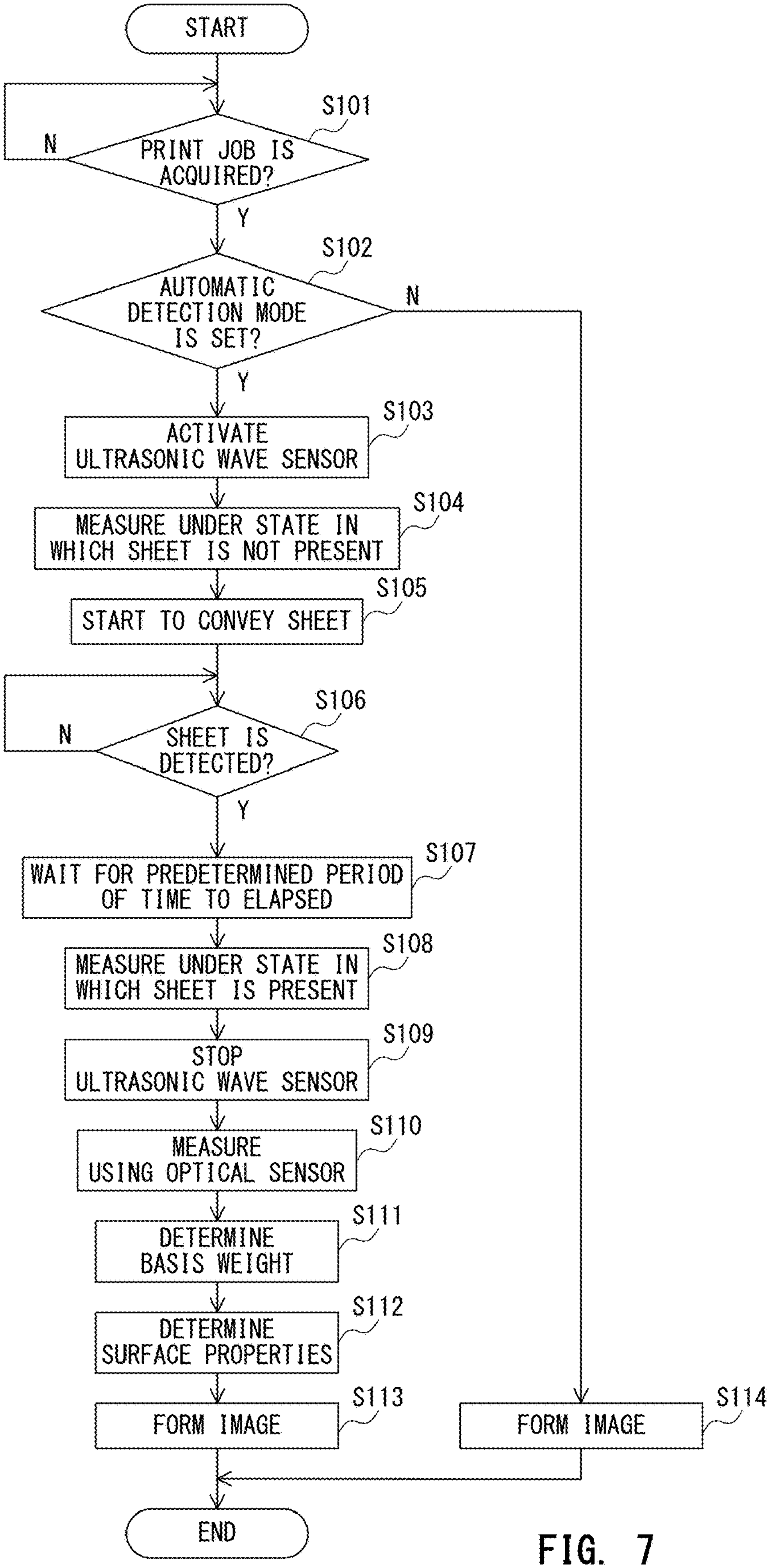
FIG. 7 is a flowchart for illustrating image forming processing.

For this reason, in the at least one embodiment, there is described a configuration in which the feature amounts of the sheet S are measured while suppressing the impact of the temperature increase, the type of the sheet S is accurately discriminated, and appropriate image forming conditions are set. FIG. 7 is a flowchart for illustrating image forming processing including processing in the at least one embodiment for discriminating the type of the sheet S. The control unit 400 and the information processing unit 160 work in cooperation to perform this processing. In the at least one embodiment, in an initial state, that is, in a case where the image forming apparatus 201 is activated, a power supply voltage is not being supplied to the ultrasonic wave sensor 120.

The control unit 400 waits until an instruction to start a print job is acquired from the operation unit 502 or the host device 501 (Step S101: N). In a case where the control unit 400 acquires an instruction to start a print job (Step S101: Y), the control unit 400 determines whether an automatic detection mode of the type of the sheet S is set (Step S102). Setting of the automatic detection mode is described later.

In a case where the automatic detection mode is set (Step S102: Y), the control unit 400 transmits to the power supply voltage controller 170 a command signal instructing the power supply voltage controller 170 to supply the power supply voltage to the ultrasonic wave sensor 120 to cause the power supply voltage to be applied to the ultrasonic wave sensor 120 (Step S103). The ultrasonic wave sensor 120 is activated as a result of the application of the power supply voltage. The control unit 400 transmits an instruction to the information processing unit 160 to cause the ultrasonic wave sensor 120 to perform ultrasonic measurement under a state in which the sheet S is not present (Step S104). The information processing unit 160 stores the measurement result (output value) of the ultrasonic wave sensor 120 in the state in which the sheet S is not present in an internal memory.

The control unit 400 starts conveyance of the sheet S (Step S105). The control unit 400 waits until the sheet detection sensor 270 detects the sheet S (Step S106: N). In a case where the sheet detection sensor 270 detects the sheet S (Step S106: Y), while continuing the conveyance of the sheet S, the control unit 400 waits until a predetermined period of time elapses (Step S107). The predetermined period of time is the time that elapses from when the leading edge of the sheet S is detected by the sheet detection sensor 270 until the leading edge is nipped by the conveyance roller pair 290. As a result of waiting for the predetermined period of time, the sheet S is conveyed to the measurement position of the media sensor 100.

In a case where the predetermined period of time has elapsed, the control unit 400 transmits to the information processing unit 160 an instruction to perform measurement processing on the feature amounts of the sheet S by using the media sensor 100. As a result, the information processing unit 160 causes the ultrasonic wave sensor 120 to perform ultrasonic measurement under a state in which the sheet S is present, and stores the measurement result (output value) in the internal memory (Step S108). In a case where the measurement processing by the ultrasonic wave sensor 120 ends, the control unit 400 transmits to the power supply voltage controller 170 a command signal to stop supplying the power supply voltage to the ultrasonic wave sensor 120, and the application of the power supply voltage to the ultrasonic wave sensor 120 is stopped (Step S109). This causes the ultrasonic wave sensor 120 to stop operating. Next, the information processing unit 160 causes the optical sensor 150 to perform measurement processing on the sheet S, and stores the measurement result (luminance value) in the internal memory (Step S110).

Figure 8:
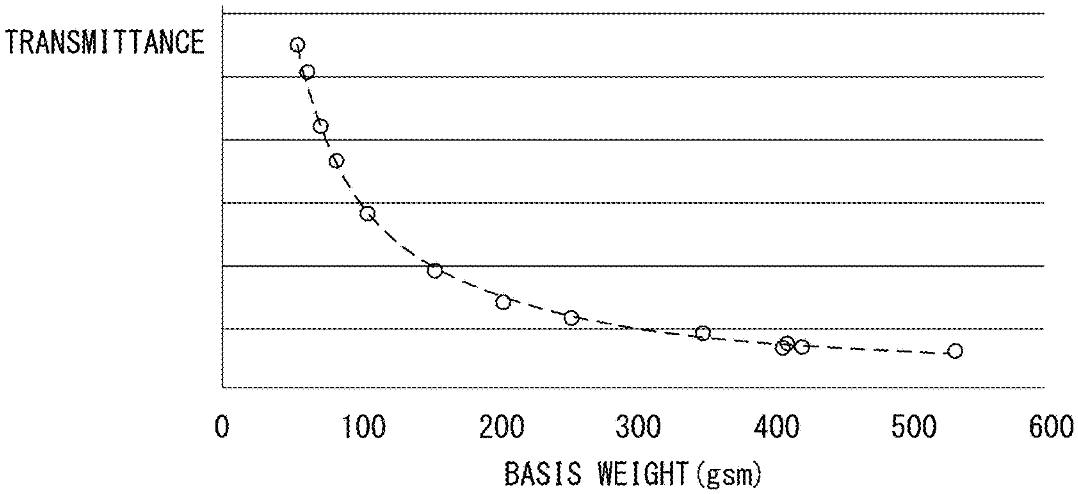
FIG. 8 is an explanatory graph of a relationship between transmittance and basis weight.

The information processing unit 160 acquires the transmittance from the measurement results by the ultrasonic wave sensor 120 for both the state in which the sheet S is present and the state in which the sheet S is not present, and converts the transmittance into a basis weight (Step S111). FIG. 8 is an explanatory diagram of the relationship between transmittance and basis weight. The conversion of the transmittance to the basis weight is performed using a conversion formula or a conversion table expressing such a relationship. The information processing unit 160 determines the surface properties of the sheet S from the luminance value of the sheet S measured by the optical sensor 150, and generates surface property information representing the surface properties (Step S112). The surface property information includes, for example, a difference integrated value and a brightness integrated value. The information processing unit 160 transmits the basis weight information representing the basis weight obtained in this way and the surface property information to the control unit 400.

Figure 9:
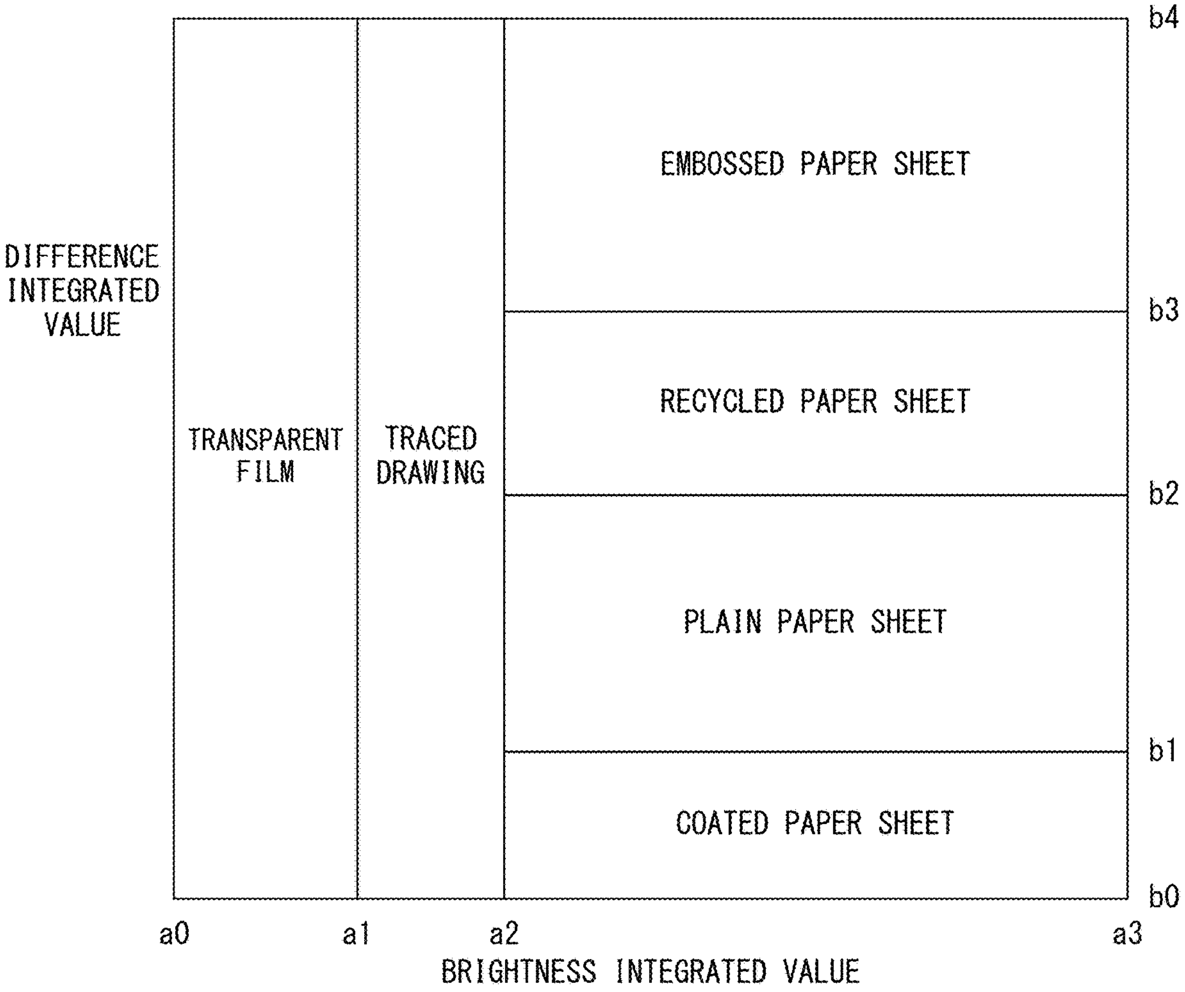
FIG. 9 is a classification table of sheet types.

The control unit 400 discriminates the type of the sheet S based on the basis weight information and the surface property information acquired from the information processing unit 160, and forms an image on the sheet S based on the image forming conditions corresponding to the type of the sheet S (Step S113). FIG. 9 is a classification table of sheet types based on a difference integrated value and a brightness integrated value. In FIG. 9, the table is a matrix in which the vertical axis represents the difference integrated value and the horizontal axis represents the brightness integrated value, and the surface properties of the sheet are measured in advance and the sheet type is classified by machine learning. Threshold values for classifying the sheet types are a0 to a3 for the brightness integrated value and b0 to b4 for the difference integrated value. Those threshold values are stored in the sheet type database 402 of the memory 401. The control unit 400 discriminates the sheet type by comparing the surface property information with each threshold value.

FIG. 10 is a classification table of sheet types based on a basis weight. The sheet type is determined based on which basis weight range the basis weight measured by the media sensor 100 falls within. Threshold values indicating the basis weight range are indicated by C1 to C23, and are stored in the sheet type database 402 of the memory 401.

The control unit 400 discriminates the sheet type based on the basis weight information acquired from the media sensor 100 and the basis weight range of the classification table shown in FIG. 10 of the sheet type determined based on the surface property information and the classification table of FIG. 9. The control unit 400 determines the image forming conditions corresponding to the determined sheet type. FIG. 11 is a classification table of sheet type which summarizes the classification tables of FIG. 9 and FIG. 10. Such a classification table may be stored in the sheet type database 402 of the memory 401, and the control unit 400 may determine the image forming conditions based on such a classification table.

In a case where the automatic detection mode is not set (Step S102: N), the control unit 400 forms an image on the sheet S based on the image forming conditions corresponding to the type of the sheet S set by the user (Step S114). As described above, in a case where the automatic detection mode is set, the image forming apparatus 201 automatically discriminates the type of the sheet S, determines the image forming conditions based on the discriminated result, and performs image formation. The power supply voltage is applied to the ultrasonic wave sensor 120 after the conveyance of the sheet S is started and before the measurement of the sheet S is started, and the application of the power supply voltage is stopped after the measurement ends. Therefore, the impact of a temperature increase on the measurement results is suppressed.

Figure 12:
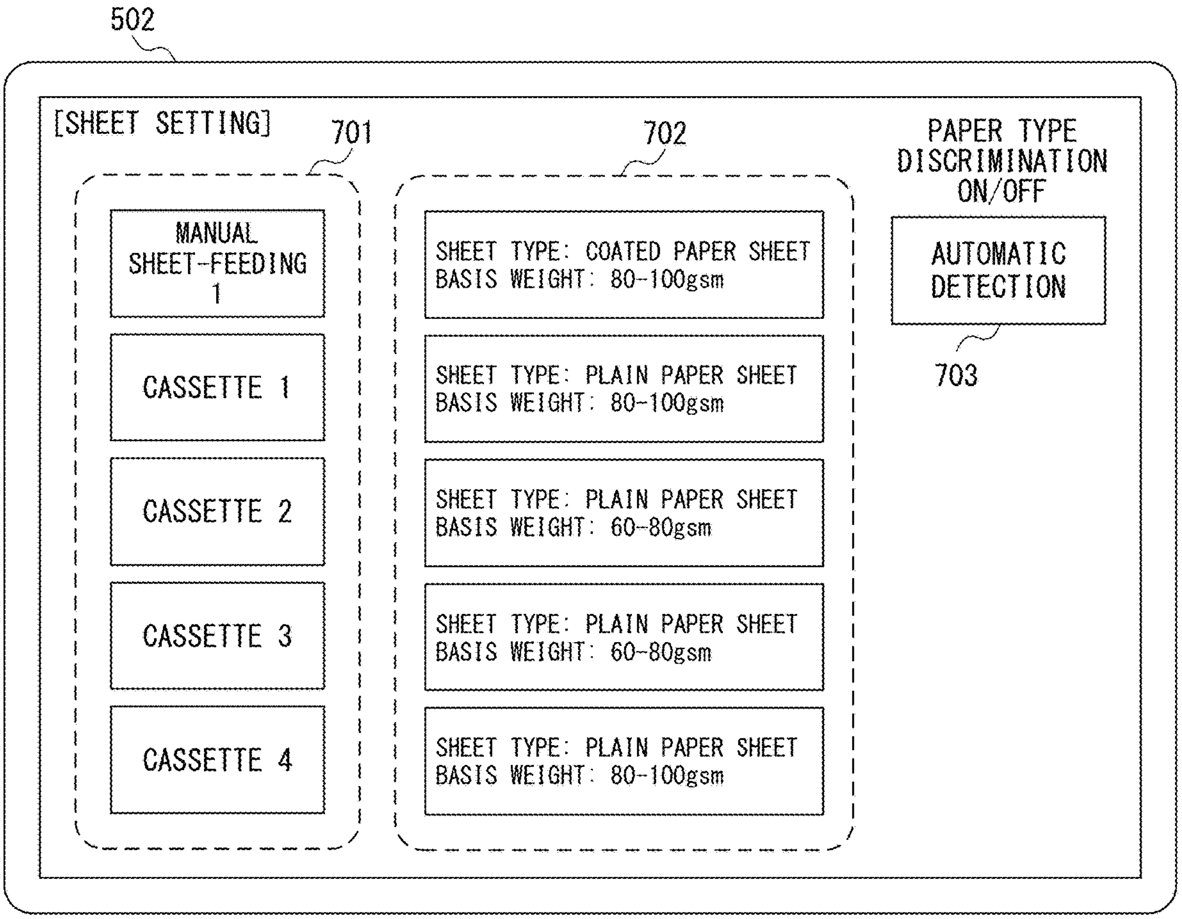
FIG. 12 is an exemplary view of an automatic detection mode setting screen.

FIG. 12 is an exemplary view of a setting screen in the automatic detection mode. This setting screen is displayed on the display of the operation unit 502. On this setting screen, the type and the basis weight of the sheets accommodated in each sheet-feeding cassette 1 and the sheets placed on the manual feeding tray 5 can be set. The name of each sheet-feeding cassette 1 and manual feeding tray 5 are displayed in a display area 701. The types and the basis weights of the sheets accommodated in each sheet-feeding cassette 1 and the sheets placed on the manual feeding tray 5 are displayed in a display area 702. The display area 701 shows the manual feeding tray 5 at the top and four sheet-feeding cassettes 1 (cassettes 1, 2, 3, and 4) below that.

Through use of the media sensor 100, the type and the basis weight of a sheet fed from any of the sheet feeding ports (manual feeding tray 5 or each sheet-feeding cassette 1) can be automatically discriminated. In order to use such an automatic discrimination function, an automatic detection button 703 is displayed on the setting screen. When setting the automatic detection mode, the user selects (presses) the automatic detection button 703 by using the input interface of the operation unit 502. In a case where the automatic detection button 703 is pressed, the automatic detection mode is switched between an "ON" setting (i.e., automatic detection is enabled) and an "OFF" setting (i.e., automatic detection is disabled).

In a case where the control unit 400 acquires from the operation unit 502 a notification indicating that the automatic detection mode is set, the control unit 400 stores the fact that the automatic detection mode is set in the memory 401. The memory 401 has, for example, a flag indicating a setting state of the automatic detection mode, and the state of this flag is changed by pressing the automatic detection button 703. The automatic detection mode setting screen may be displayed on the host device 501. In this case, the automatic detection mode is set by using an input device arranged in the host device 501.

In the image forming apparatus 201 having the configuration described above, it is possible to suppress the increase in temperature of the ultrasonic wave sensor 120 during measurement because the power supply voltage is applied at the timing when the ultrasonic wave sensor 120 measures the sheet S. Therefore, the impact of the temperature change on the measurement result of the ultrasonic wave sensor 120 (media sensor 100) is suppressed, the discrimination accuracy of the type of the sheet S is improved, and appropriate image forming conditions are set.

Modification Example 1

Figure 13:
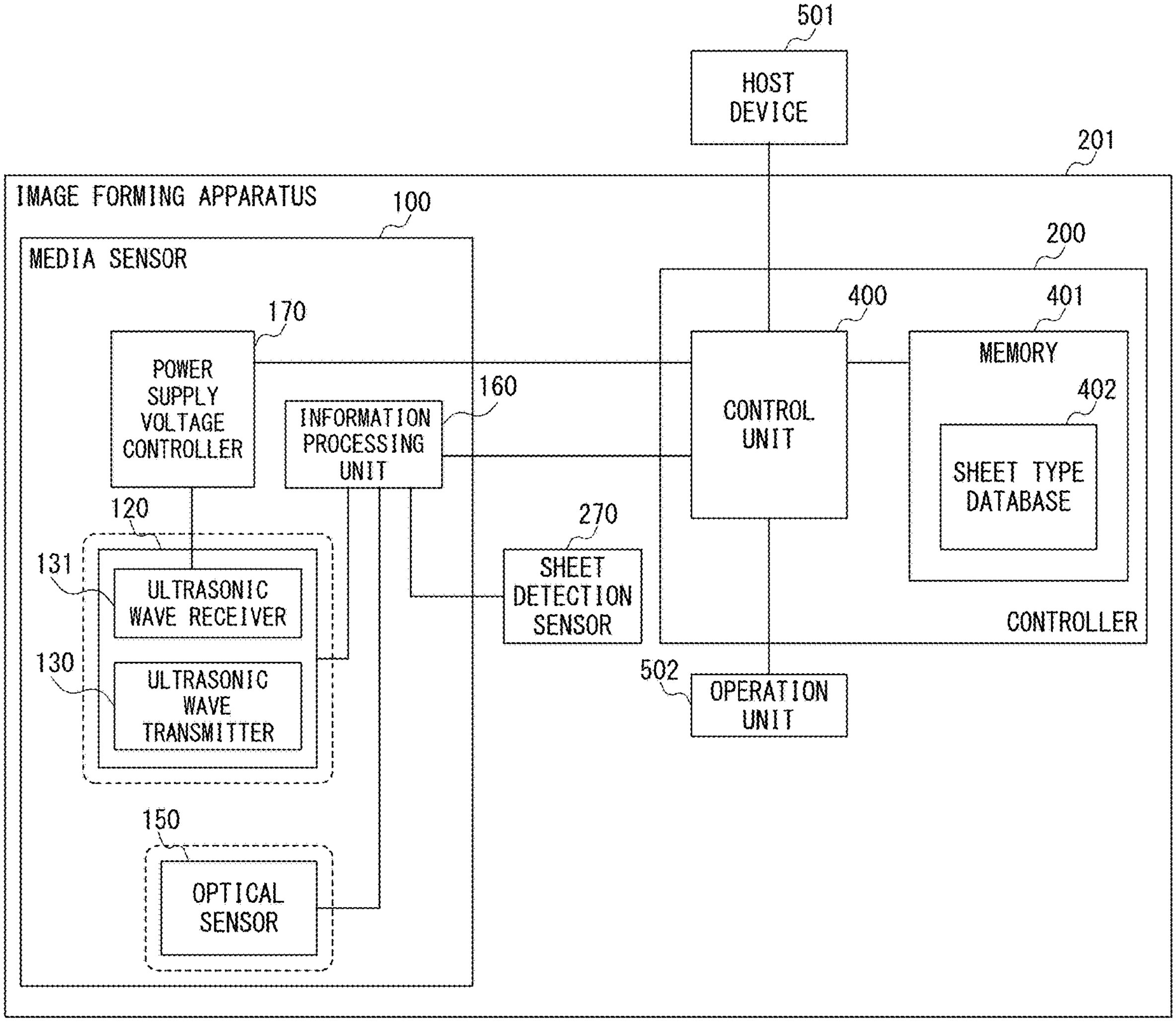
FIG. 13 is an exemplary diagram of a modification example of the controller.

FIG. 13 is an exemplary diagram of a modification example of the controller of FIG. 3. The difference from FIG. 3 is that the power supply voltage controller 170 controls the application of the power supply voltage to the ultrasonic wave receiver 131 rather than to the entire ultrasonic wave sensor 120. Fluctuation in the measurement result (output value) of the ultrasonic wave sensor 120 is greatly influenced by a change in the temperature of the ultrasonic wave receiver 131 outputting the output value. Therefore, fluctuation in the output value can be suppressed by adjusting the supply of the power supply voltage to the ultrasonic wave receiver 131.

Figure 14:
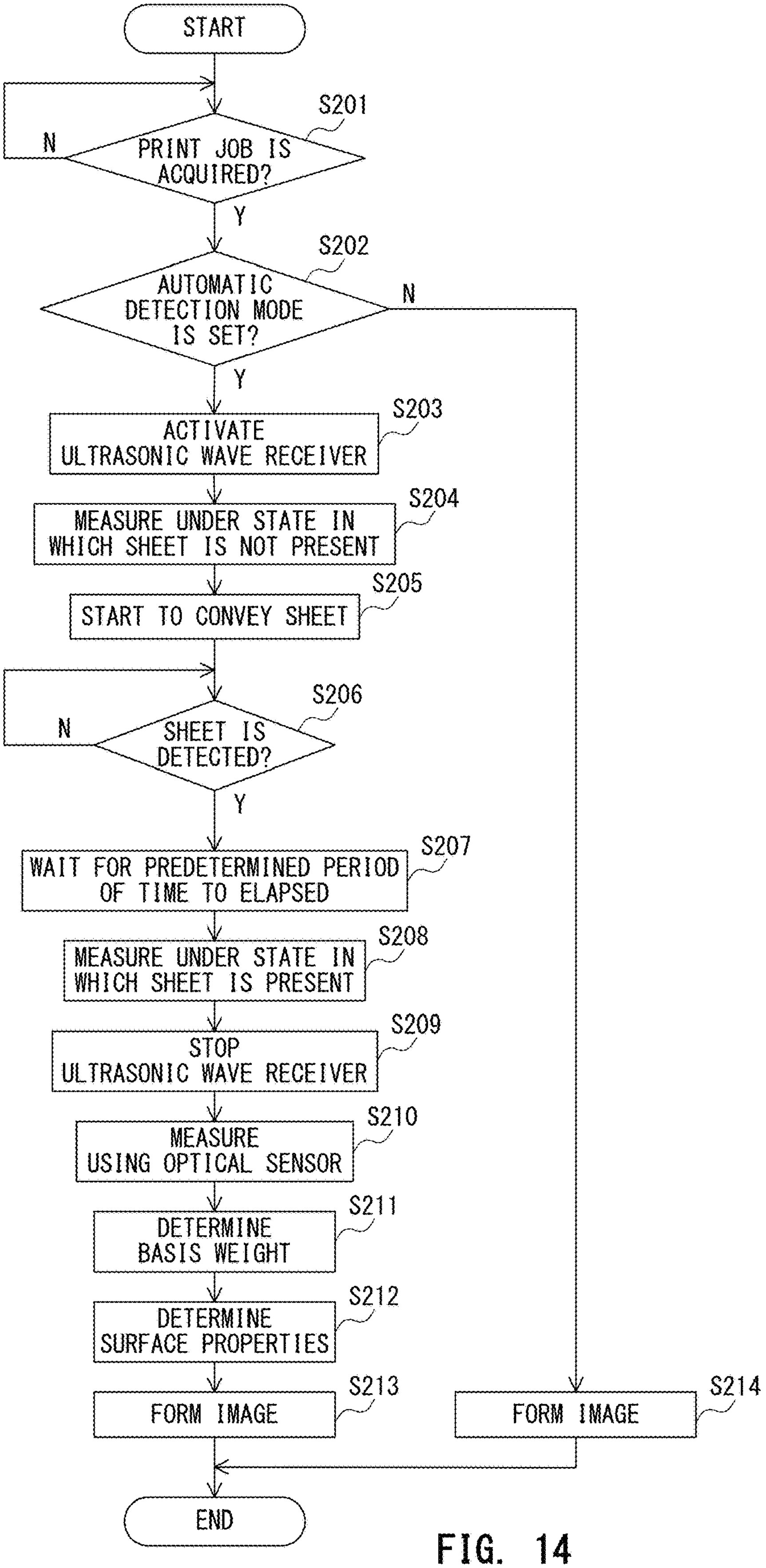
FIG. 14 is a flowchart for illustrating image forming processing.

FIG. 14 is a flowchart for illustrating image forming processing including processing for discriminating the type of the sheet S in this case. The flowchart of FIG. 14 differs from the flowchart of FIG. 7 only in that the part to which the supply of the power supply voltage is controlled in the processing steps of Step S203 and Step S209 is the ultrasonic wave receiver 131, and the other processing steps are the same. In this case as well, the power supply voltage is applied to the ultrasonic wave sensor 120 only at the time of measuring the sheet S, and thus the impact of a change in temperature on the measurement result of the ultrasonic wave sensor 120 is suppressed, the discrimination accuracy of the type of the sheet S is improved, and appropriate image forming conditions are set.

Modification Example 2

In the processing of FIG. 7, the application of the power supply voltage to the ultrasonic wave sensor 120 is stopped immediately after the measurement is complete. However, in a case in which the temperature of the media sensor 100 has sufficiently decreased by the time the next measurement starts, and the temperature does not have an impact on the measurement result, it is not required to stop applying the power supply voltage.

Figure 15:
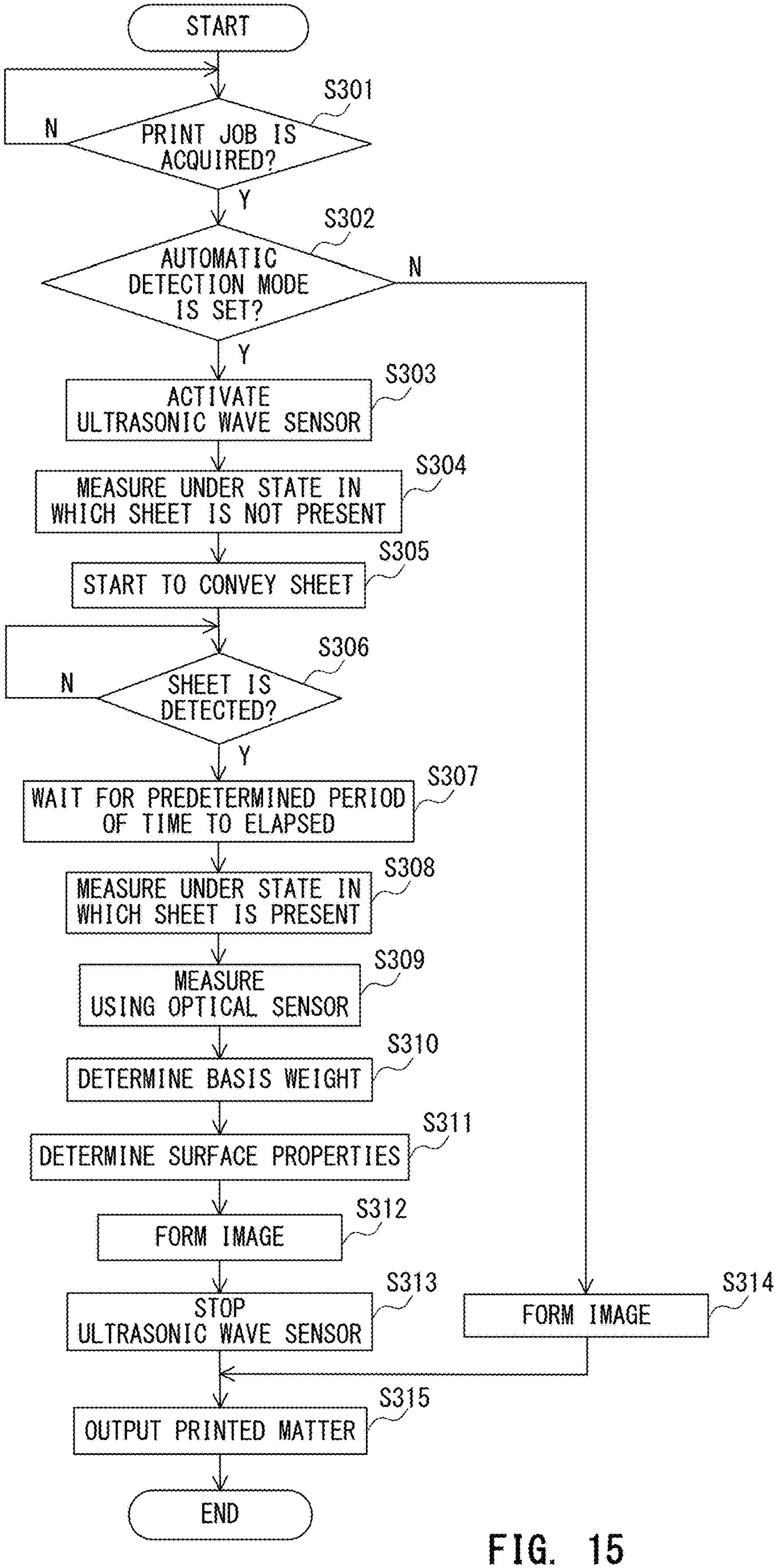
FIG. 15 is a flowchart for illustrating image forming processing.

FIG. 15 is a flowchart for illustrating image forming processing including processing for discriminating the type of the sheet S in this case. The flowchart of FIG. 15 is the same as the flowchart of FIG. 7 up to the measurement processing by the ultrasonic wave sensor 120 in Step S308. In FIG. 15, in a case where the measurement processing by the ultrasonic wave sensor 120 ends, processing steps including measurement by the optical sensor 150, determination of the basis weight, determination of the surface properties, and the image formation are performed in the same manner as the processing steps of Step S110 to Step S113 of FIG. 7 (Step S309 to Step S312). Then, the control unit 400 transmits to the power supply voltage controller 170 a command signal to stop supplying the power supply voltage to the ultrasonic wave sensor 120, and application of the power supply voltage to the ultrasonic wave sensor 120 is stopped (Step S313). This causes the ultrasonic wave sensor 120 to stop operating. After stopping the ultrasonic wave sensor 120, the control unit 400 outputs the sheet S (printed matter) on which the image has been formed to the delivery space D (Step S315).

Thus, in Modification Example 2, the supply of the power supply voltage to the ultrasonic wave sensor 120 is stopped before the printed matter is output. As long as the supply of the power supply voltage to the ultrasonic wave sensor 120 is stopped before the sheet S is output, the decrease in the temperature of the ultrasonic wave sensor 120 is sufficient enough so that the measurement result is not affected even when it is required to immediately discriminate the type of the sheet S for the next print job. Therefore, the impact of a change in temperature on the measurement result of the ultrasonic wave sensor 120 is suppressed, the discrimination accuracy of the type of the sheet S is improved, and appropriate image forming conditions are set.

Modification Example 3

Figure 16:
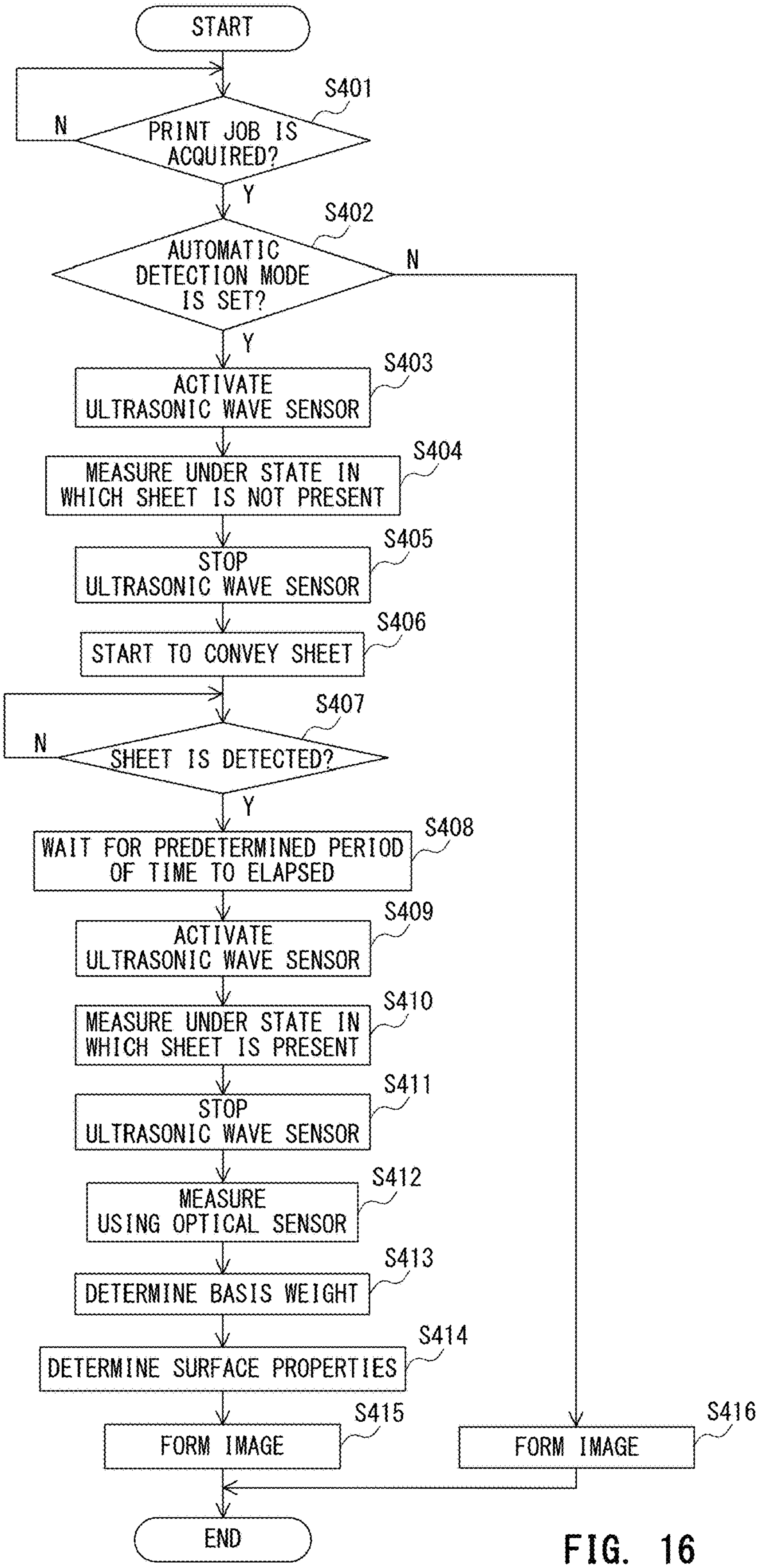
FIG. 16 is a flowchart for illustrating image forming processing.

In the processing of FIG. 7, in order to perform ultrasonic measurement in the processing steps of Step S104 and Step S108, the power supply voltage is applied to the ultrasonic wave sensor 120 before the processing step of Step S104, and the application of the power supply voltage is stopped after the processing step of Step S108. It suffices that the power supply voltage be applied to the ultrasonic wave sensor 120 at the timing of each ultrasonic processing step. FIG. 16 is a flowchart for illustrating image forming processing including processing for discriminating the type of the sheet S in this case. The flowchart of FIG. 16 is the same as the flowchart in FIG. 7 up to the measurement processing performed in Step S404 by the ultrasonic wave sensor 120 in a state in which the sheet S is not present.

When the measurement processing by the ultrasonic wave sensor 120 in a state in which the sheet S is not present ends, the control unit 400 transmits to the power supply voltage controller 170 a command signal to stop supplying the power supply voltage to the ultrasonic wave sensor 120, and the application of the power supply voltage to the ultrasonic wave sensor 120 is stopped (Step S405). This causes the ultrasonic wave sensor 120 to stop operating. The control unit 400 starts conveyance of the sheet S in the same manner as the processing steps of Step S105 to Step S107 of FIG. 7, and in a case where the sheet detection sensor 270 detects the sheet S, the control unit 400 waits until a predetermined time elapses (Step S406 to Step S408).

When the predetermined time has elapsed, the control unit 400 transmits to the power supply voltage controller 170 a command signal instructing the power supply voltage controller 170 to supply a power supply voltage to the ultrasonic wave sensor 120 to cause the power supply voltage to be applied to the ultrasonic wave sensor 120 (Step S409). The ultrasonic wave sensor 120 is activated as a result of the application of the power supply voltage. After activation of the ultrasonic wave sensor 120, the control unit 400 transmits to the information processing unit 160 an instruction to perform measurement processing on the feature amounts of the sheet S by using the media sensor 100. As a result, the information processing unit 160 causes the ultrasonic wave sensor 120 to perform ultrasonic measurement under a state in which the sheet S is present, and stores the measurement result (output value) in the internal memory (Step S410).

In a case where the measurement processing by the ultrasonic wave sensor 120 ends, the control unit 400 transmits to the power supply voltage controller 170 a command signal instructing the power supply voltage controller 170 to stop supplying the power supply voltage to the ultrasonic wave sensor 120, and application of the power supply voltage to the ultrasonic wave sensor 120 is stopped (Step S411). This causes the ultrasonic wave sensor 120 to stop operating. Then, the control unit 400 performs processing steps including measurement by the optical sensor 150, determination of the basis weight, determination of the surface properties, and the image formation in the same manner as the processing steps of Step S110 to Step S114 of FIG. 7 (Step S412 to Step S416).

Thus, in Modification Example 3, the ultrasonic wave sensor 120 is supplied with the power supply voltage at the timing at which measurement is performed. That is, the power supply voltage is applied to the ultrasonic wave sensor 120 before the measurement in a state in which the sheet S is not present starts, the application of the power supply voltage is ended after the measurement ends, the power supply voltage is applied before the measurement in a state in which the sheet S is present starts, and the application of the power supply voltage is ended after the measurement ends. Therefore, the impact of a change in temperature on the measurement result of the ultrasonic wave sensor 120 is suppressed, the discrimination accuracy of the type of the sheet S is improved, and appropriate image forming conditions are set.

A case corresponding to a change in the temperature of the ultrasonic wave sensor 120 has been described above, but the same processing may be performed on all the sensors of the media sensor 100. The at least one embodiment is effective for any case in which the generation of heat by the application of the power supply voltage affects the measurement result of the sensor. Further, like Modification Example 1, Modification Examples 2 and 3 may have a configuration in which the application of the power supply voltage to the ultrasonic wave receiver 131 is controlled.

In the above description, the media sensor 100 is arranged in the image forming apparatus 201, but as long as the media sensor 100 is arranged on the upstream side of the secondary transfer unit 201D in the conveyance direction of the sheet, the media sensor 100 may be arranged external to the image forming apparatus 201. Further, the processing by the information processing unit 160 in the media sensor 100 may be performed by the control unit 400. In contrast, the processing performed by the control unit 400 may be performed by the information processing unit 160. In this case, the sheet type database 402 may be stored in a memory which can be accessed from the information processing unit 160. In any case, it suffices that the above-mentioned processing be performed by the control unit 400 and the information processing unit 160 in cooperation.

In addition, the image forming apparatus 201 described above determines control parameters such as the image forming conditions by detecting the type and the basis weight of the sheet S from the feature amounts of the sheet S measured by the media sensor 100. However, the control parameters may be directly determined from the feature amounts. The media sensor 100 may be a device which measures the physical properties of another sheet.

The media sensor 100 described above is an example, and is not limited to a configuration including the optical sensor 150 and the ultrasonic wave sensor 120. The media sensor 100 may include another sensor which can measure a feature amount of the sheet S. Further, the media sensor 100 may include any one of the optical sensor 150 and the ultrasonic wave sensor 120.

Further, in the above description, the configuration of the image forming apparatus 201 has been described, but the present disclosure may be applied to any apparatus including a sheet detection device that includes the media sensor 100 and the controller 200. For example, such a sheet detection device may be used in an image reading device which reads an image printed on a sheet while conveying the sheet. The image reading device includes an auto document feeder (ADF). Through incorporating the sheet detection device in the ADF, it becomes possible to stably read an image and convey the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-149055, filed Sep. 14, 2023, which is hereby incorporated by reference herein in its entirety.

What is claimed is:

1. A sheet detection device comprising:

a measurement unit configured to measure a sheet; and a power supply voltage controller configured to control supply of a power supply voltage to the measurement unit, wherein the power supply voltage controller is configured to start supplying the power supply voltage to the measurement unit when receiving a notification indicating that a mode for performing sheet measurement is set.

2. The sheet detection device according to claim 1, further comprising:

a conveyance unit configured to convey the sheet; and a sheet detection sensor configured to detect the sheet conveyed by the conveyance unit, wherein the power supply voltage controller is configured to start supplying the power supply voltage to the measurement unit in response to detection of the sheet by the sheet detection sensor, and wherein the measurement unit is configured to measure the sheet conveyed by the conveyance unit.

3. The sheet detection device according to claim 2, wherein the power supply voltage controller is configured to stop supplying the power supply voltage to the measurement unit when measurement of the sheet by the measurement unit ends.

4. The sheet detection device according to claim 1, further comprising a conveyance unit configured to convey the sheet, wherein the measurement unit is configured to perform a first measurement under a state in which the sheet is not conveyed by the conveyance unit and a second measurement under a state in which the sheet is conveyed by the conveyance unit, and wherein the power supply voltage controller is configured to supply the power supply voltage to the measurement unit before the first measurement starts and to stop supplying the power supply voltage to the measurement unit after the second measurement ends.

5. The sheet detection device according to claim 4, wherein the power supply voltage controller is configured to supply the power supply voltage to the measurement unit before the first measurement starts, to stop supplying the power supply voltage to the measurement unit after the first measurement ends, to supply the power supply voltage to the measurement unit before the second measurement starts, and to stop supplying the power supply voltage to the measurement unit after the second measurement ends.

6. The sheet detection device according to claim 5, further comprising a sheet detection sensor configured to detect the sheet conveyed by the conveyance unit, wherein the power supply voltage controller is configured to supply the power supply voltage to the measurement unit before the second measurement starts in response to detection of the sheet by the sheet detection sensor.

7. The sheet detection device according to claim 4, wherein the measurement unit is an ultrasonic wave sensor.

8. The sheet detection device according to claim 7, wherein the ultrasonic wave sensor includes:

an ultrasonic wave transmitter configured to output an ultrasonic wave; and an ultrasonic wave receiver configured to receive an ultrasonic wave output from the ultrasonic wave transmitter, and to output an output value corresponding to the received ultrasonic wave, and wherein the power supply voltage controller is configured to control the power supply voltage supplied to the ultrasonic wave receiver.

9. The sheet detection device according to claim 1, further comprising:

a conveyance unit configured to convey a sheet; and a sheet detection sensor configured to detect the sheet conveyed by the conveyance unit, wherein the power supply voltage controller is configured to, when receiving a notification indicating that a mode for performing sheet measurement is set, start supplying the power supply voltage to the measurement unit in a case where the sheet detection sensor detects the sheet.

10. The sheet detection device according to claim 1, wherein the power supply voltage controller is configured to, in a case where an instruction to start a job is acquired, start supplying the power supply voltage to the measurement unit when receiving a notification indicating that a mode for performing sheet measurement is set.

11. An image forming apparatus comprising:

a sheet detection device including:

a measurement unit configured to measure a sheet; and a power supply voltage controller configured to control supply of a power supply voltage to the measurement unit, an image forming unit configured to form an image on the sheet by using an image forming condition based on a result of measuring the sheet by the measurement unit; and a delivery space to which the sheet having an image formed thereon is to be delivered, wherein the power supply voltage controller is configured to start supplying the power supply voltage to the measurement unit when receiving a notification indicating that a mode for performing sheet measurement is set.

12. The image forming apparatus according to claim 11, wherein the power supply voltage controller is configured to stop supplying the power supply voltage to the measurement unit before the sheet having an image formed thereon is delivered to the delivery space.

13. The image forming apparatus according to claim 11, wherein the power supply voltage controller is configured to supply the power supply voltage to the measurement unit in a case where an instruction to start a print job is acquired.

* * * * *